UNITED STATES PATENT OFFICE.

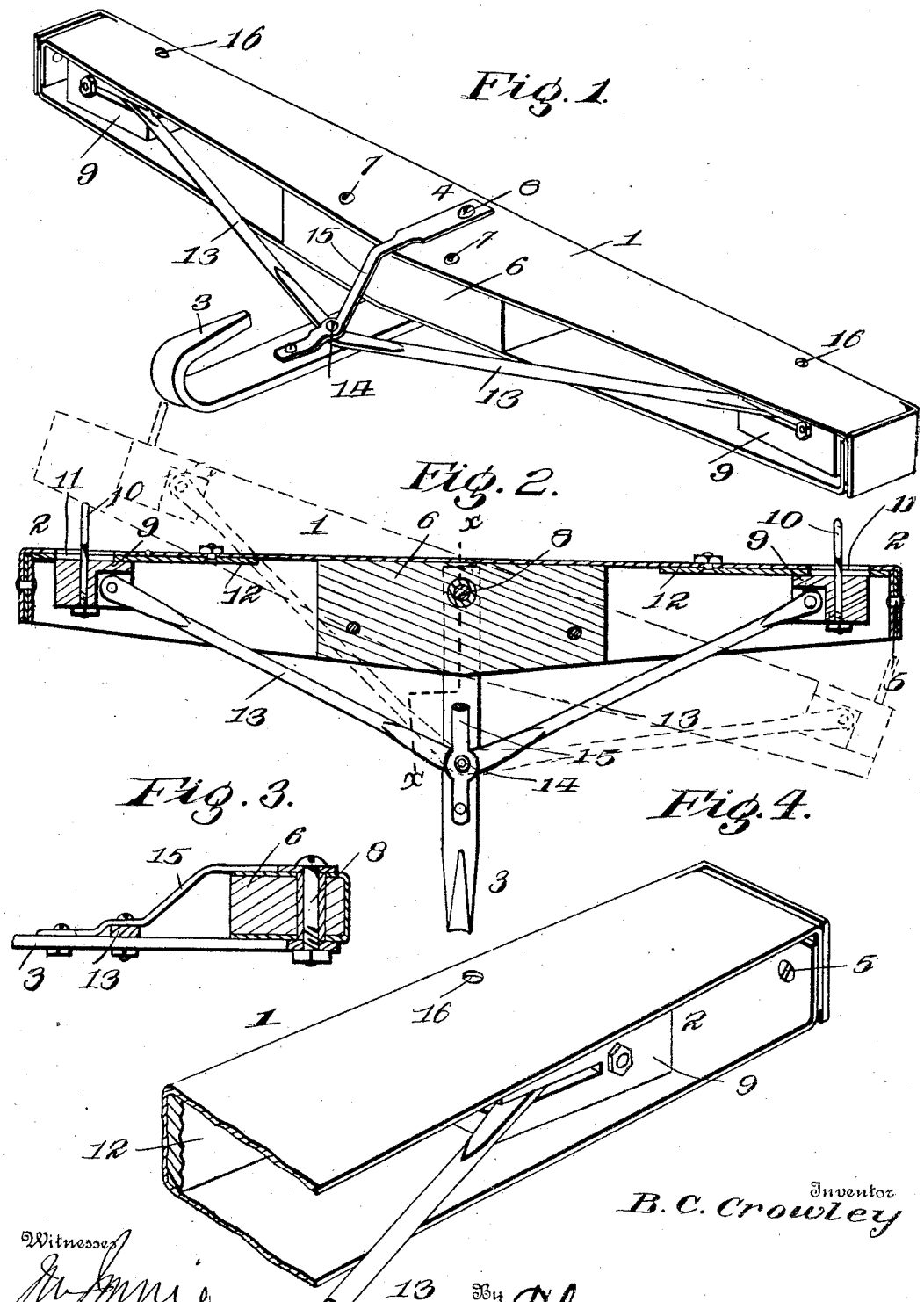

BENJAMIN C. CROWLEY, OF IDAHO FALLS, IDAHO.

DOUBLETREE.

No. 832,777.  Specification of Letters Patent.  Patented Oct. 9, 1906.

Application filed February 6, 1906. Serial No. 299,829.

*To all whom it may concern:*

Be it known that I, BENJAMIN C. CROWLEY, a citizen of the United States, residing at Idaho Falls, in the county of Bingham and State of Idaho, have invented certain new and useful Improvements in Doubletrees, of which the following is a specification.

The primary object of this invention is to devise a doubletree of novel structure for equalizing the draft as between animals of different strength, the structure being such as to decrease the leverage of the stronger-pulling animal and to proportionately increase the leverage of the weaker-pulling animal, while at the same time preventing the turning of the doubletree to such an extent as to throw the weaker animal nearer the wheel, which to obviate it has been common heretofore to provide stay-chains, the present invention obviating the necessity for such.

The invention consists of a doubletree, movable draft attachments at or near each end thereof, means connecting said draft attachment to insure simultaneous movement thereof, and a pivoted hitch for connecting the doubletree to the vehicle or like contrivance to which the draft is to be applied.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a doubletree embodying the invention. Fig. 2 is a horizontal section of the doubletree, the dotted lines showing the relative arrangement of the parts when the draft attachments have moved to the limit of their travel in one direction. Fig. 3 is a sectional view on the line $x\ x$ of Fig. 2. Fig. 4 is a detail perspective view of an end portion of the doubletree, showing more clearly the manner of bending the terminal portions.

Corresponding and like parts are referred to in the following description and indicated in all the views of the drawings by the same reference characters.

The doubletree 1 may be of any structure and is provided at or near its ends with draft attachments 2, the same having a sliding movement to admit of varying the leverage, and a hitch 3, the latter being pivoted to the doubletree at 4 and constructed to be attached to a vehicle or other contrivance in any convenient way. The outer or rear end of the hitch is preferably of hook form, so as to be engaged with a ring, clevis, or like part. In the preferred structure the doubletree is hollow and open at its rear side, this structure being advantageous in that it results in lightness and at the same time provides a housing and directing means for the draft attachments 2. In the simplest form the doubletree is constructed of sheet metal cut into the required shape and having longitudinal and end portions bent upon themselves to form the hollow space. The terminal portions of the front, top, and bottom of the doubletree are bent and overlapped, as shown most clearly in Fig. 4, and are secured by a fastening 5, which may be a rivet or like securing means. A filling-block 6 is centrally arranged between the top and bottom portions of the doubletree and is held in place in any manner, as by means of bolts 7 or like fastenings. The filling-block 6 strengthens and reinforces the doubletree and provides a substantial bearing for the pivot-fastening 8, employed for connecting the hitch 3 to the doubletree.

The draft attachments 2 are located at opposite ends of the doubletree and are movable with reference thereto to provide for varying the leverage according to the application of draft. The draft attachments may be of any structure and, as shown, comprise blocks or slides 9 and eyes or like coupling means 10. The blocks or slides 9 are arranged within the end portions of the doubletree and are directed in their reciprocating movements thereby. The eyes 10 or like coupling means pass through slots 11 in the front side of the doubletree and have firm connection with the blocks or slides so as to sustain the pulling strain to which they will be subjected. The parts 10 preferably consist of eyebolts passed through the slots 11 and openings in the slides or blocks 9 and having burs applied to their rear ends to prevent their pulling through the blocks or slides when under strain. A wear-plate 12 is interposed between the front side of each block or slide 9 and the inner wall of the front portion of the doubletree, so as to sustain the wear incident to the play of the blocks or slides. These wear-plates may be of any material and are preferably riveted or otherwise fastened to the inner side of the front wall of the doubletree. A rod 13 connects the draft attachments to cause them to move in unison, so that as one approaches a line passed longitudinally through the pivot 8 the other will recede from said line, thereby admitting of the effective leverage upon one side increasing as the leverage upon the opposite side decreases, with the result that the stronger-pulling animal carries a greater load. The middle portion of the connecting-rod 13 is deflected rearwardly and pivotally connected to the hitch 3 at 14. The rod 13 is connected in any manner with the blocks or slides 9, preferably in a way to admit of limited play, so as to obviate any binding action incident to the change of angle between said slides and rod as the parts move and automatically adapt themselves to the draft. A hammer-strap 15 is connected at one end to the hitch 3 and at its opposite end to the pivot-fastening 8 and extends over the connecting-rod 13 and receives the upper end of the pivot-fastening 14.

A doubletree constructed substantially as herein specified is adapted to be coupled to a vehicle or other contrivance to be drawn by means of the hitch 3, and the swingletrees are coupled to the draft attachments 2. In the event of one of the animals exerting a stronger pull than the other the doubletree turns upon the pivot-fastening 8 by reason of the connection of the rod 13 with the hitch 3, said rod having a movement imparted thereto in a way to cause the blocks or slides 9 to move longitudinally of the doubletree, with the result that the leverage of the stronger-pulling animal is decreased and the leverage of the weaker-pulling animal increased, thereby providing for automatically adjusting the leverage to the conditions in the pulling force exerted. As shown by the dotted lines in Fig. 2, the slide or block at the end of the doubletree to which the weaker animal is hitched will come square against the closed end of the doubletree when at the limit of its travel, and by reason of the distribution of the strain over the different points of the doubletree the latter will be prevented from turning so as to throw the weaker animal against the front wheel, thereby obviating the necessity of stay-chains or like appliances to effect this result. Oil-openings 16 are provided in the upper side of the doubletree to admit of the introduction of a lubricant between the slides and the parts of the doubletree against which they rub, so as to minimize wear and friction.

Having thus described the invention, what is claimed as new is—

1. A hollow doubletree, slides located within opposite end portions thereof and provided with means for coupling the draft thereto, a hitch pivoted to the doubletree, and a rod connecting the slides to said hitch to effect simultaneous movement thereof.

2. A hollow doubletree having the terminal portions of its inclosing sides bent and overlapped and secured, slides arranged within opposite end portions of the doubletree and provided with draft-coupling means, a pivoted hitch, and a rod connecting the slides to the hitch.

In testimony whereof I affix my signature in presence of two witnesses.

BENJAMIN C. CROWLEY. [L. S.]

Witnesses:
N. P. HANSON,
S. G. CROWLEY.